(12) United States Patent
Schroeder et al.

(10) Patent No.: US 7,615,171 B2
(45) Date of Patent: Nov. 10, 2009

(54) COMPOSITE WHEEL AND METHOD FOR MANUFACTURING THE SAME

(75) Inventors: Del C Schroeder, Bloomfield Hills, MI (US); Mariana G Forrest, Troy, MI (US); Joseph G Salmonowicz, Ortonville, MI (US); John G Argeropoulos, Sterling Heights, MI (US); Jason E Fulcher, Royal Oak, MI (US); Ida M Baier, White Lake, MI (US); Janice M Makarewicz, Royal Oak, MI (US); David G Speth, Sylvan Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 828 days.

(21) Appl. No.: 10/885,818

(22) Filed: Jul. 7, 2004

(65) Prior Publication Data

US 2004/0255462 A1 Dec. 23, 2004

Related U.S. Application Data

(62) Division of application No. 10/225,334, filed on Aug. 21, 2002, now Pat. No. 7,040,714.

(51) Int. Cl.
*B32B 37/00* (2006.01)
(52) U.S. Cl. .................. 264/103; 264/257; 264/258
(58) Field of Classification Search .................. 264/103, 264/257, 258
See application file for complete search history.

(56) References Cited

U.S. PATENT DOCUMENTS

| | | | |
|---|---|---|---|
| 978,516 A | 12/1910 | Turner | |
| 1,071,099 A | 8/1913 | Schwene | |
| 1,078,581 A | 11/1913 | Horn | |
| 1,102,193 A | 6/1914 | Horn | |
| 1,156,486 A | 10/1915 | Krebs | |
| 1,269,172 A | 6/1918 | Forsyth | |
| 1,305,820 A | 6/1919 | Macbeth | |
| 1,354,221 A | 9/1920 | Shoemaker | |
| 1,422,167 A | 7/1922 | Barry | |
| 1,446,138 A | 2/1923 | Thompson | |
| 1,470,742 A | 10/1923 | Ibach | |
| 1,610,023 A | 12/1926 | Meldrum | |
| 1,635,490 A | 7/1927 | Meldrum | |
| 1,684,552 A | 9/1928 | Meldrum | |
| 2,544,387 A | 3/1951 | Kerr | |

(Continued)

FOREIGN PATENT DOCUMENTS

CA 628786 10/1961

(Continued)

*Primary Examiner*—Jeff H Aftergut
(74) *Attorney, Agent, or Firm*—Ralph E. Smith

(57) ABSTRACT

A composite wheel and a method of manufacture is provided for a vehicle wherein the composite wheel has a first and second section mounted to an annular mount. At least one of the first wheel section and second wheel section is composed of a resin having at least one braided polymeric fiber. The first and second sections are each formed by folding the braided fiber into a preform and then injecting resin into a mold containing the preform. The first and second sections are then bonded to each other and the annular mount.

10 Claims, 6 Drawing Sheets

U.S. PATENT DOCUMENTS

| | | | |
|---|---|---|---|
| 3,253,862 A | 5/1966 | Watanabe et al. | |
| 3,357,747 A | 12/1967 | Eldred | |
| 3,695,728 A | 10/1972 | Haussels | |
| 3,811,737 A | 5/1974 | Lejeune | |
| 3,862,779 A | 1/1975 | Jayne | |
| 4,072,358 A | 2/1978 | Ridha | |
| 4,114,953 A | 9/1978 | Baumgartner | |
| 4,173,992 A | 11/1979 | Lejeune | |
| 4,294,490 A | 10/1981 | Woelfel | |
| 4,410,385 A * | 10/1983 | Murphy et al. | 156/181 |
| 4,483,729 A | 11/1984 | Fujisaki et al. | |
| 4,511,184 A | 4/1985 | Schauf et al. | |
| 4,527,839 A * | 7/1985 | Fujitaka et al. | 301/64.705 |
| 4,573,745 A | 3/1986 | Fujisaki et al. | |
| 4,636,344 A | 1/1987 | McDougall | |
| 4,721,342 A | 1/1988 | Daniels et al. | |
| 4,741,578 A | 5/1988 | Viellard | |
| 4,832,414 A | 5/1989 | Jones | |
| 4,846,908 A * | 7/1989 | Aldrich et al. | 156/148 |
| 4,900,095 A | 2/1990 | Brubaker | |
| 4,908,494 A * | 3/1990 | Faiz et al. | 219/121.72 |
| 5,018,795 A | 5/1991 | Engerand et al. | |
| 5,045,261 A | 9/1991 | Weeks | |
| 5,073,315 A * | 12/1991 | Bertelson | 264/490 |
| 5,133,591 A | 7/1992 | Skaggs et al. | |
| 5,217,766 A * | 6/1993 | Flonc et al. | 428/34.5 |
| 5,234,259 A | 8/1993 | Nishimuro et al. | |
| 5,268,139 A | 12/1993 | Sheeler | |
| 5,277,479 A | 1/1994 | Koyama et al. | |
| 5,362,134 A | 11/1994 | Carmona | |
| 5,564,793 A | 10/1996 | Whiteford | |
| 5,762,405 A | 6/1998 | Dempsey | |
| 5,782,540 A | 7/1998 | Camfield et al. | |
| 5,826,948 A | 10/1998 | Schroeder et al. | |
| 5,915,796 A * | 6/1999 | Beyer | 301/59 |
| 5,918,947 A | 7/1999 | Stach et al. | |
| 5,985,072 A | 11/1999 | Finck et al. | |
| 6,095,543 A | 8/2000 | McMahon et al. | |
| 6,106,650 A * | 8/2000 | Cheshire | 156/229 |

FOREIGN PATENT DOCUMENTS

| | | |
|---|---|---|
| DE | 158834 | 6/1905 |
| DE | 26 51 178 A1 | 7/1978 |
| DE | 36 20 097 A1 | 12/1987 |
| EP | 0307112 A2 * | 3/1989 |
| FR | 522522 | 7/1921 |
| GB | 293497 | 7/1928 |
| GB | 885675 | 12/1961 |
| GB | 1033377 | 6/1966 |
| JP | 58-122201 | 7/1983 |
| JP | 59-32502 | 2/1984 |
| JP | 59-195403 | 11/1984 |
| JP | 5-77602 | 3/1993 |
| SU | 1759656 A1 * | 7/1992 |
| WO | WO 02/20252 A1 | 3/2002 |

* cited by examiner

COMPOSITE WHEEL AND METHOD FOR MANUFACTURING THE SAME

This application is a divisional of U.S. patent application Ser. No. 10/225,334 filed Aug. 21, 2002, now U.S. Pat. No. 7,040,714.

FIELD OF THE INVENTION

The present invention relates generally to automobile wheels, and more particularly to a composite wheel and a method for manufacturing composite wheels.

BACKGROUND OF THE INVENTION

The automotive industry has increasingly been motivated to provide automobiles with decreased mass following a general trend toward more fuel-efficient vehicles. Accordingly, automobile manufacturers have developed more economical, lightweight vehicle components. Also, in order to produce vehicles that are lighter and less expensive, the automotive industry has been moved to develop composite vehicle body components.

The cost of an automobile can be reduced by minimizing the weight of its wheels. Specifically, weight and cost savings can accrue from using composite material for the wheels. In addition, the reduced weight of the composite wheels may make it possible to incorporate a comparatively simplified, cost-effective, lighter-weight suspension system because of a less unsprung wheel mass.

Although composite wheels represent substantial benefits, they conventionally present a common drawback of no two wheels being structurally identical. More specifically, the typical composite-wheel manufacturing process results in each wheel having its own unique fiber-flow pattern. With each wheel having a different flow pattern, it is difficult to apply standards to the manufacture of the composite wheels.

SUMMARY OF THE INVENTION

The present invention provides a composite wheel for a vehicle. The composite wheel has a first wheel section coupled to a second wheel section. The second wheel section is coupled to an annular mount. At least one of the first wheel section and the second wheel section includes a resin such as vinyl ester, polyester or epoxy, having at least one braided polymeric fiber such as graphite.

The present invention further provides a method for manufacturing a composite wheel. A braided fiber is folded and set into a preform and a resin is injected into a mold containing the preform. This process creates a finished part, whether the first wheel section or the second wheel section. After both the first and second wheel sections are formed, the wheel is then assembled by securing the second wheel section to the annular mount, and securing the first wheel section to the second wheel section and the annular mount.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is generally related to a composite wheel for an automotive vehicle, as well as a manufacturing process for a composite wheel. However, it is to be understood that the principles embodied herein are equally applicable to a composite wheel for use with other types of vehicles.

Figure 1:
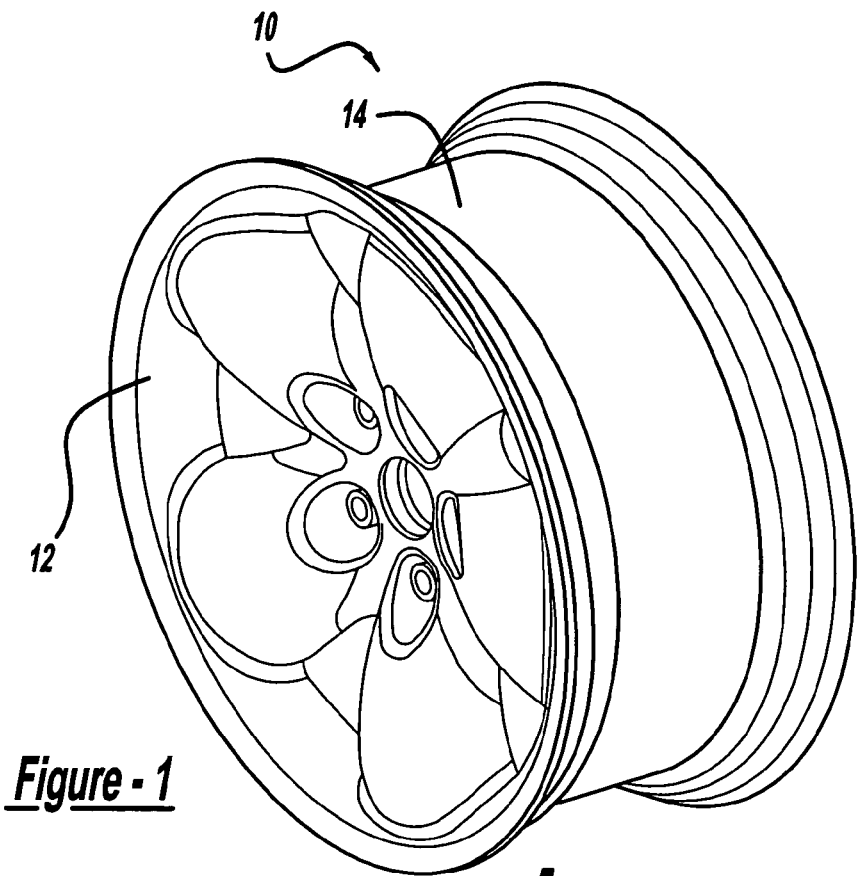
FIG. 1 is a perspective view of a composite wheel according to the principles of the present invention.
Figure 2:
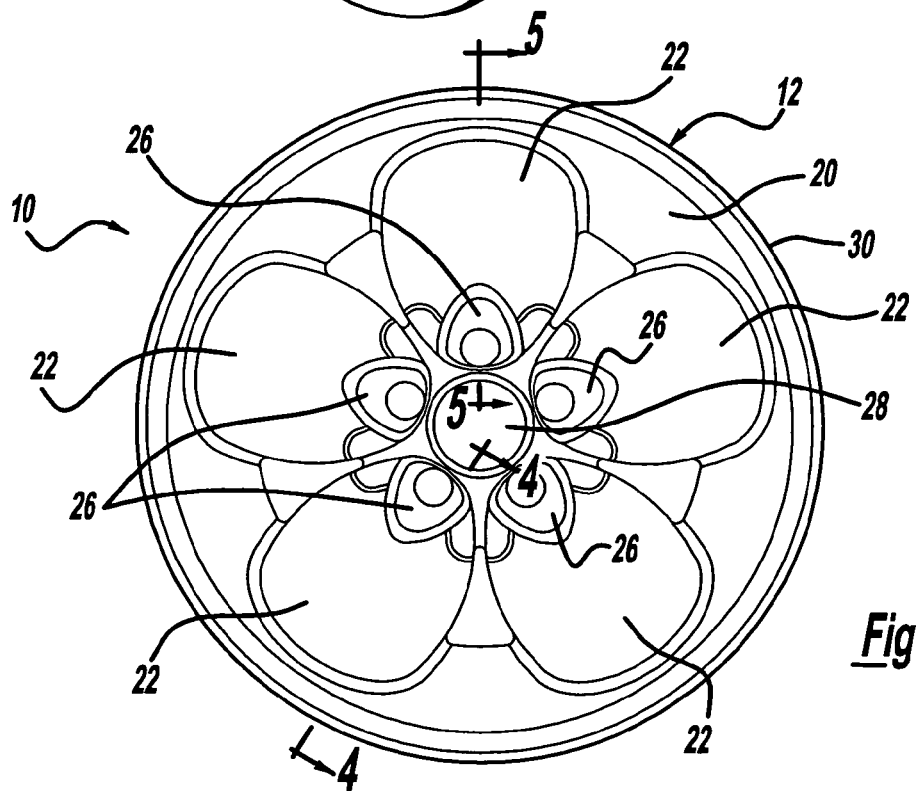
FIG. 2 is a front view of the composite wheel of FIG. 1.
Figure 3:
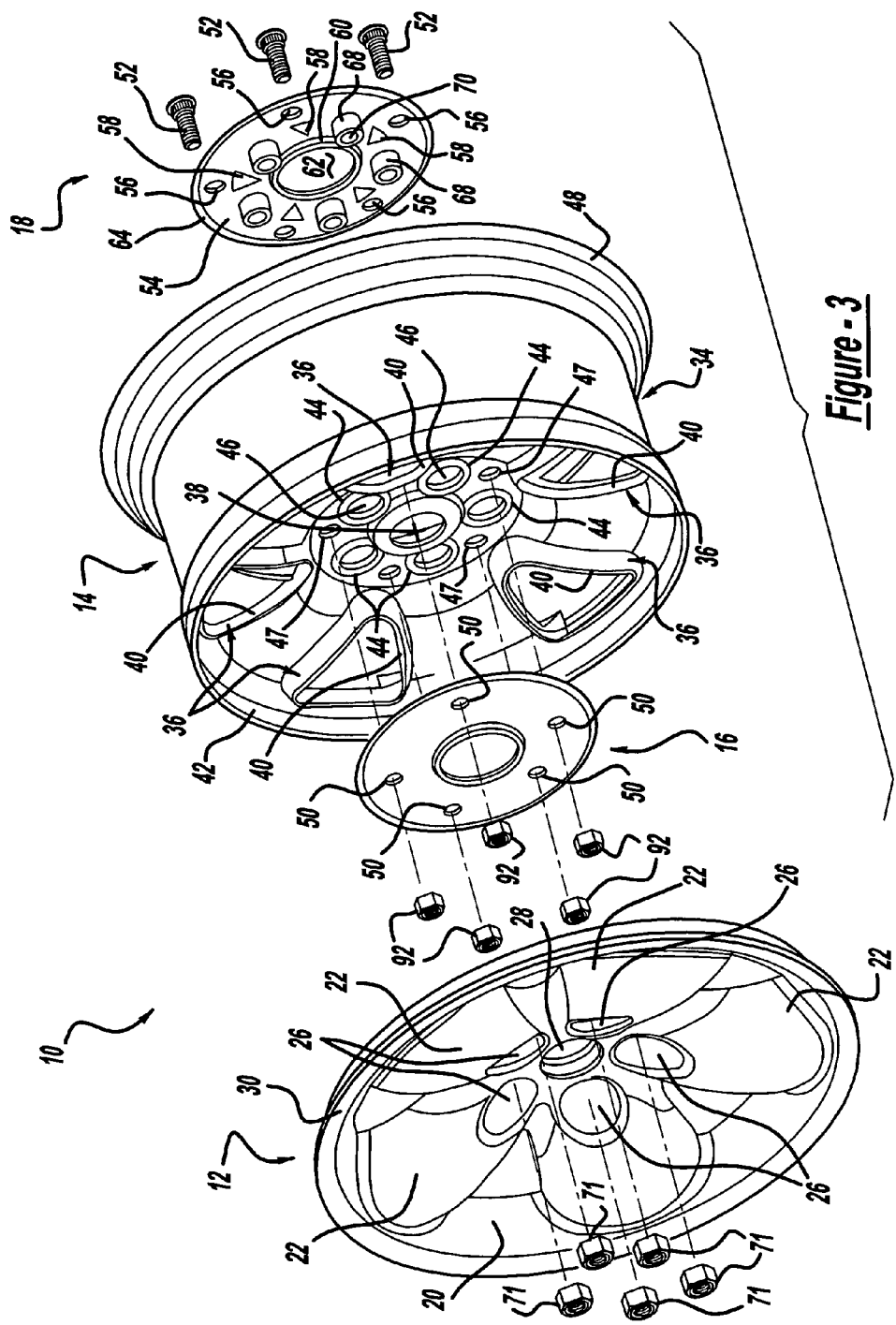
FIG. 3 is an exploded view of an example of a composite wheel of FIG. 1.

Referring generally to FIGS. 1, 2 and 3, a composite wheel 10 for use with a vehicle is shown. The composite wheel 10 includes a first section 12 coupled to a second section 14. An annular support 16 is further coupled to the second section 14, between the first and second sections 12, 14. An annular mount 18 abuts a face of the second section 14 and is coupled to both the first and second sections 12, 14.

Figure 4:
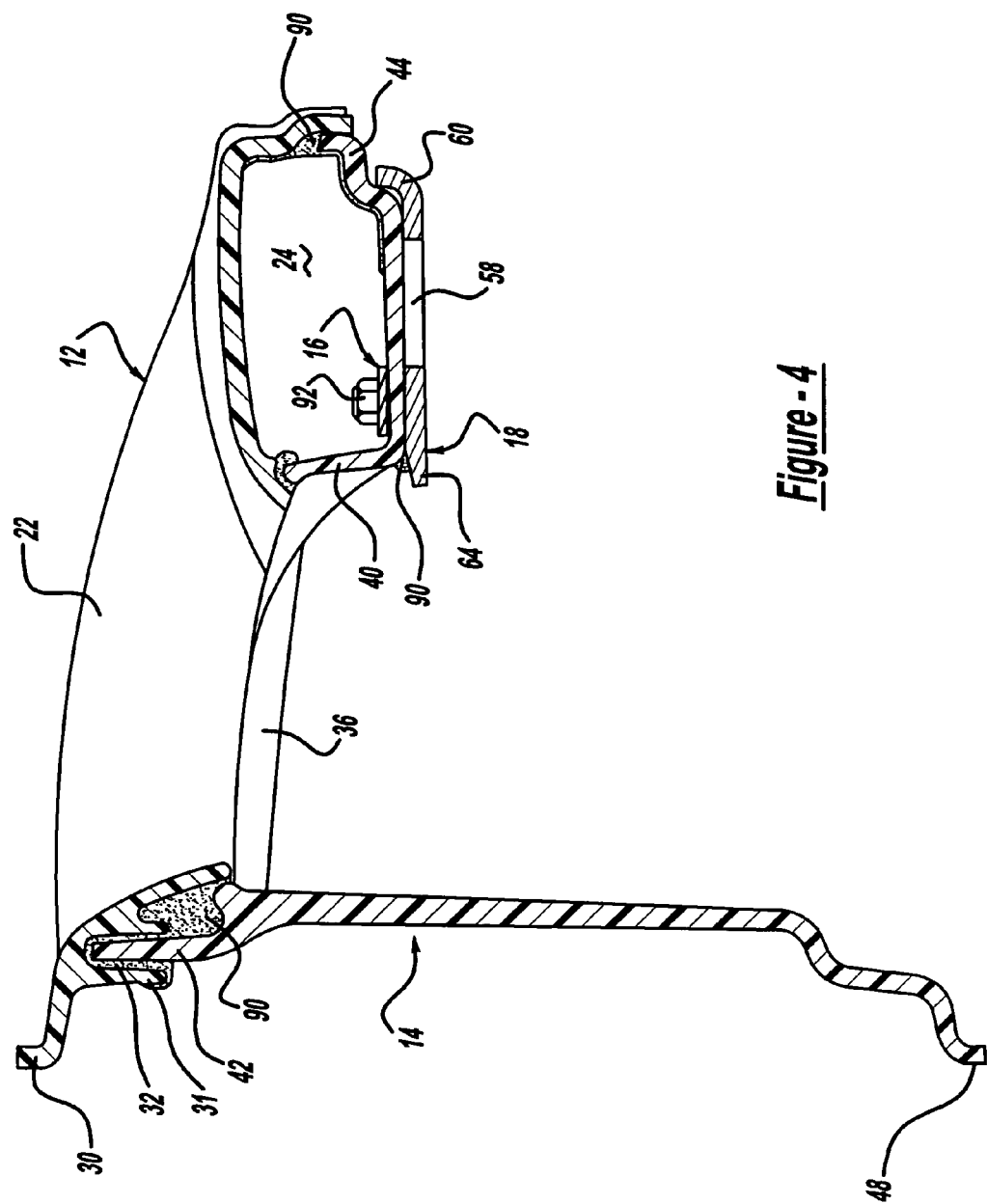
FIG. 4 is a cross-section of the composite wheel of FIG. 2 along Line 4-4.

With reference to FIGS. 2, 3 and 4, the first section 12 generally includes a peripheral ring 20 having a plurality of axially focused extensions or spokes 22. For the exemplary embodiment of the composite wheel 10, the ring 20 has five spokes 22, each having a generally hollow concave inner surface 24 for mass savings. Each spoke 22 includes a socket 26 to accommodate coupling to the annular mount 18. An axial opening 28, generally located at the axis of the ring 20 at the point where the spokes 22 merge, is used to mount the composite wheel 10 on a hub of a vehicle axle (not shown). In addition, a peripheral edge of the ring 20 includes an annular flange 30 that is used in coordination with the second section 14 to retain a tire (not shown) upon the composite wheel 10. Adjacent and oppositely disposed to the flange 30, the ring 20 also includes a finger 31 defining a groove 32 along an inner edge of the ring 20 for mating with the second section 14.

Figure 5:
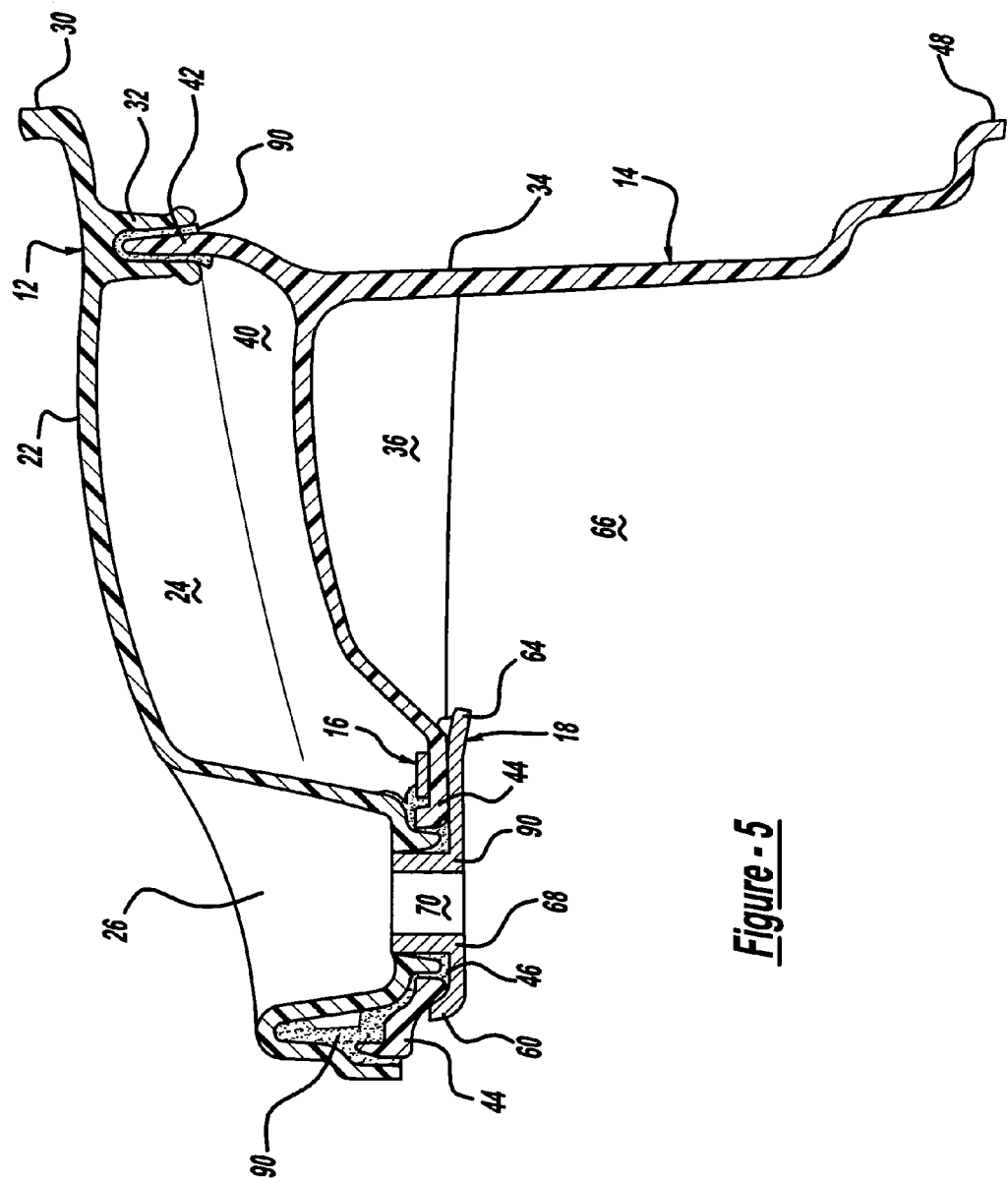
FIG. 5 is a cross-section of the composite wheel of FIG. 2 along Line 5-5.

The second section 14 generally includes a cylindrical body 34 having an annular flange 48 at its inner periphery and an annular lip 42 at its outer periphery. A cylinder 45 extends peripherally between the annular flange 48 and annular lip 42. Together, the annular flange 48 of the second section 14 and the annular flange 30 of the first section 12 cooperate to secure a tire (not shown) to the composite wheel 10. Mating extensions or mating spokes 36 corresponding to the spokes 22 of the first section 12 extend axially inward from the annular lip 42 toward a central axis generally identified as 38. The mating spokes 36 each have a generally triangular-shaped wall 40 that is configured to mate with the concave inner surface 24 of the spokes 22 of the first section 12, as best shown in FIGS. 4 and 5. Each wall 40 generally extends from the annular lip 42 toward a raised central hub 44 disposed axially about the central axis 38.

The central hub 44 is configured to mate with the socket portion of first section 12, as shown in FIGS. 4 and 5. The central hub 44 includes an opening 46 for each socket 26 of the first section 12, wherein each socket 26 extends into a respective opening 46, as shown in FIG. 5. Further, the sockets 22 and openings 46, once joined in axial alignment, receive a portion of the annular mount 18 for joining the first and second sections 12, 14. The central hub 44 also includes openings 47 disposed between adjacent openings 46 to receive fasteners for securing the annular support 16 to the second section 14.

The annular support 16 is a ring-like plate coaxially coupled to the second section 14, as shown in FIGS. 3, 4 and 5. As best shown in FIG. 3, the annular support 16 has a plurality of openings 50 corresponding to the openings 47 in the central hub 44. Aligned openings 47 and 50 receive fasteners 52 therethrough to couple the annular support 16 to the annular mount 18 and the second section 14 via nuts 92.

Referring to FIGS. 3, 4 and 5, the annular mount 18 is a ring-like plate having a central opening 62 surrounded by an annular lip 60, a face 54, and an annular flange 64. The face 54 includes opening 56, openings 58, and annular protrusions 68. The openings 56 in the face 54 receive the fasteners 52 to couple annular mount 18 to the annular support 16 and the second section 14. The annular mount 18 further includes generally triangular-shaped openings 58, which are provided for mass savings and heat dissipation. While triangular-shaped openings 58 are shown, other shapes are contemplated within the scope of the invention. The annular lip 60 is disposed between the face 54 and central opening 62, which accommodates mounting the composite wheel 10 on the hub of a vehicle (not shown). The annular flange 64 is disposed at the outer periphery of the face 54 and is angled acutely from the plane of the face 54 to direct any stress at the inner face edge of the plate to the composite wheel 10.

The annular protrusions 68 extend generally perpendicularly from the face 54 and are configured to extend through the openings 46 of the second section 14 and the sockets 26 of the first section 12. Each protrusion 68 includes a threaded central aperture 70. The annular mount 18 attaches the composite wheel 10 to the vehicle (not shown) via lug nuts 71 threaded securely to the protrusions 68 by engagement with the threaded central aperture 70. In this embodiment, the annular support 16 and the annular mount 18 are made from a powdered metal having a steel or iron base; however, each could be stamped, machined, extruded or formed steel.

In one embodiment, the first section 12 and the second section 14 are both made from composite materials. It will be understood that it is within the scope of the invention that only one of the first and second sections 12, 14 may be made from a composite material.

Figure 6:
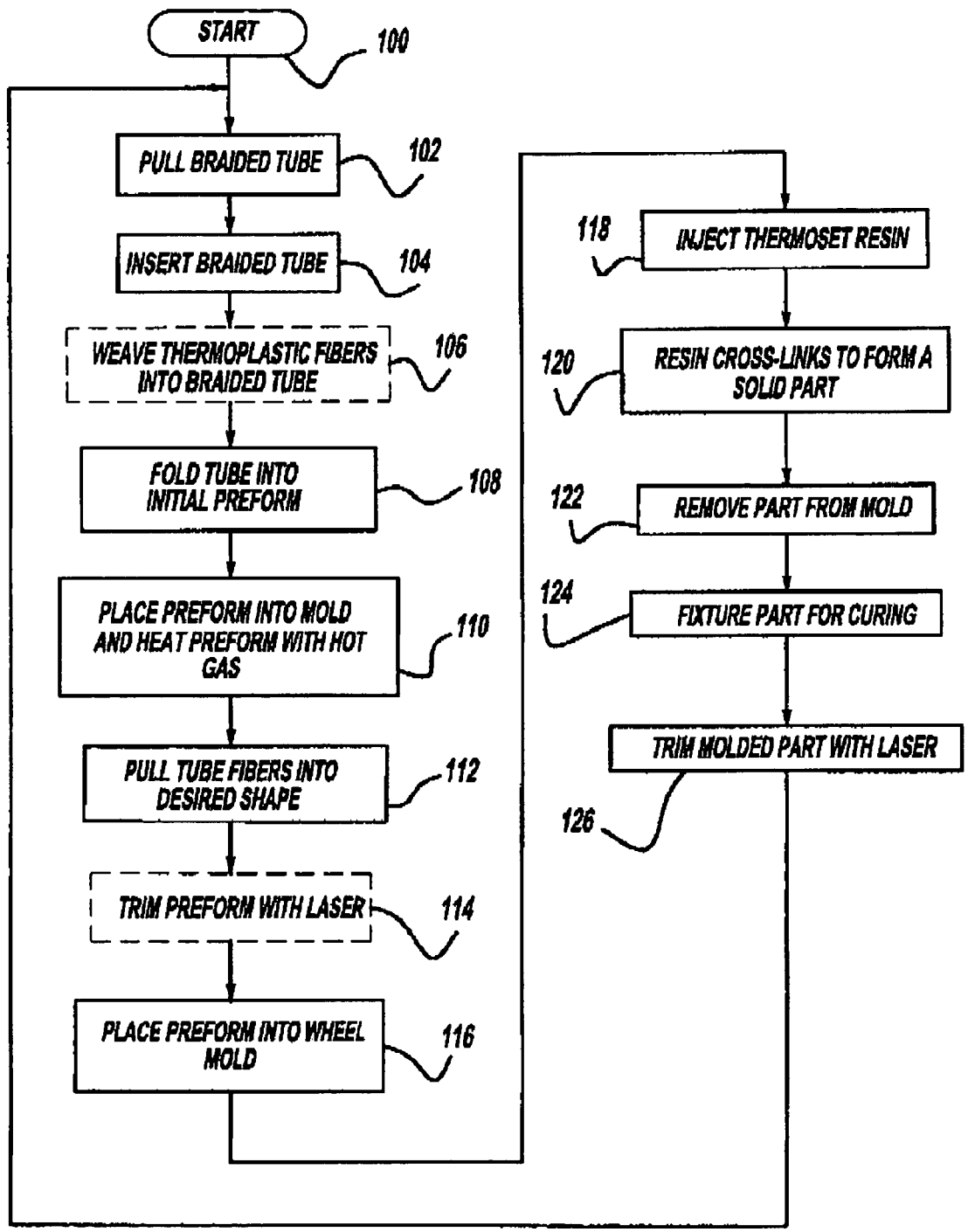
FIG. 6 is a flow diagram illustrating a method for producing a composite part for a composite wheel according to the principles of the present invention.

The resin-transfer molding process for manufacturing the composite wheel 10 begins at step 100 as shown on FIG. 6. In step 102, a braided tube of base fiber is pulled over a mandrel and inverted. The base fiber in this embodiment is braided graphite fibers; however, any type or combination of structural fibers can be used, such as, for example, Kevlar, fiberglass, or natural fibers. The braided tube is pulled to orientate the fibers, which provides repeatable fiber orientation and allows the implementation of manufacturing standards. In this embodiment, the braided graphite fibers are pulled into a generally vertical alignment. The braided tube is then inverted at step 104 to provide a double layer of fibers for increased strength. The braided structure and the process of manufacture of the preforms are capable of controlling fiber orientation for optional structural capability.

At an optional step 106, thermoplastic fibers are weaved into the braided tube to allow the tube to maintain shape when heated. The thermoplastic fibers can be from any polymeric family of materials, such as, for example, polyester, nylon, or polypropylene. While braiding thermoplastic fibers into the preform is optional, it is preferred for certain applications.

The braided tube is pulled and folded to create a skeleton of the actual wheel or a preform at step 108. The fold used is a three-thread rolled edge, wherein a short- to medium-length narrow fold is used and the lower loop-thread fold tension is pulled tight. The tightened tension pulls the upper-loop fold completely around the edge to the folding line on the underside and the fabric edge rolls inside the fold. The fold provides initial forming of the preform.

If the braided tube has thermoplastic fibers according to step 106, then the preform progresses to optional steps 110 to 114. Otherwise, the preform is preferably processed at step 116. At step 110, the preform is placed into a mold and heated with a hot gas, such as, for example, hot air or steam. The hot gas softens the thermoplastic fibers, allowing the preform to be shaped at step 112, whereat the thermoplastic fibers are shaped into the desired preform. In addition, the thermoplastic fibers hold the base fibers in place by acting as a binder. The braided preform can be trimmed by a laser at step 114.

At step 116, the preform is placed into a wheel mold cavity. The mold is then closed, and at step 118, the mold is injected with a liquid thermoset resin that encapsulates the entire braided preform. The resin can be any type of thermoset resin, such as, for example, polyester, vinyl ester or epoxy. The resin is preferably introduced into the mold at a low pressure while the air in the entire mold cavity is evacuated through the use of a vacuum pump. The mold is heated to accelerate the catalyzed resin. Time duration in mold is dependent upon the resin used, but is usually one to four minutes. At step 120, a finished part is created when the resin is fully cross-linked in the braided preform.

The part is removed from the mold in step 122 and fixtured for curing in step 126. After the part has cured, the part is trimmed with a laser in step 126. The laser cuts the part to remove molding flash or to create openings or other features on the part. The finished part may be either the first or second sections 12, 14 of the composite wheel 10. The manufacturing process then loops to step 100.

Figure 7:
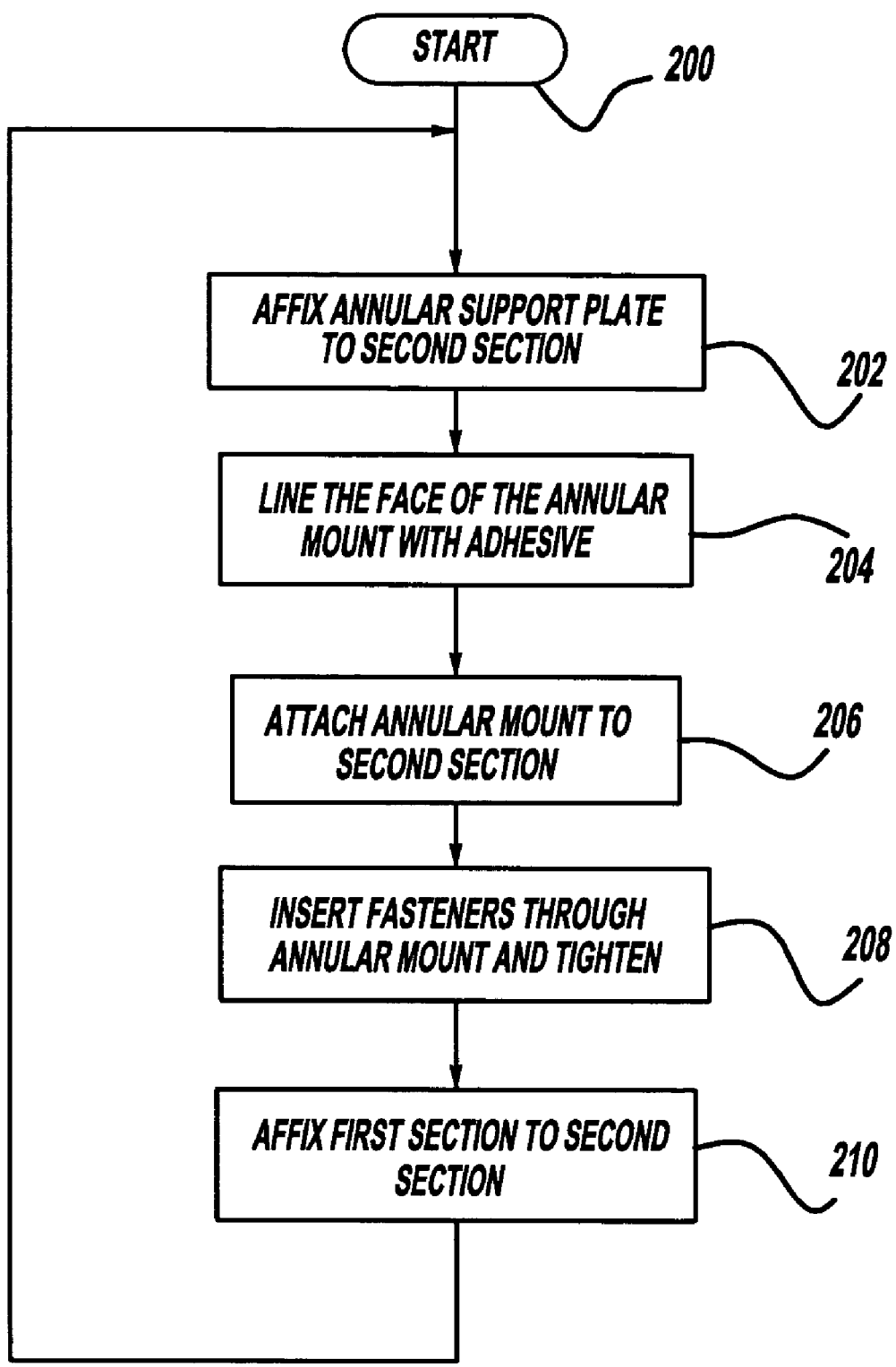
FIG. 7 is a flow diagram illustrating an assembly method for a composite wheel according to the principles of the present invention.

Referring to FIG. 7, the process for assembling the composite wheel 10 begins with step 200 as shown. In this embodiment, both the first and second sections 12, 14 are made as depicted in FIG. 6. It is to be understood, however, that just one of the first and second sections 12, 14 can be made as described.

With reference to FIG. 7, the annular support 16 is affixed to the second section 14 in step 202 by an adhesive 90. Specifically, groove 32 of the first section 12 is lined with the adhesive 90 to couple the first section 12 to the annular lip 42 of the second section 14, as shown in FIG. 5. Adhesive 90 in this embodiment is urethane based, however, any type of adhesive can be used, such as, for example, an epoxy based adhesive. The type of adhesive 90 used in the present invention will remain consistent throughout, but could vary for a particular application and still be within the scope of the invention.

Referring back to FIG. 7, in step 204, the face 54 of the annular mount 18 is lined with the adhesive 90, as illustrated in FIG. 4. With reference to FIG. 7, in the next step 206, the annular mount 18 is attached to the second section 14. The protrusions 68 of the annular mount 18 are also bonded via the adhesive 90 to the first and second sections 12, 14 as shown in FIG. 4. Referring back to FIG. 7, in step 208, the fasteners 52 are inserted through the annular mount 18 and the second section 14 and tightened by a plurality of nuts 92.

The first section 12 is then affixed to the second section 14 by the adhesive 90 in step 210. In particular, the adhesive 204 binds the central hub 44 of the second section 14 to the socket 26 of the first section 12. In addition, the adhesive 90 is used to secure the triangular shaped walls 40 of the mating spokes 36 to the spokes 22 of the first section 12, as shown in FIGS. 4 and 5. Because the annular mount 18 has already been secured to the second section 14, when the first section 12 is attached to the second section 14 it is also attached to the annular mount 18. This process then loops to step 200.

The ability to design and manufacture composite wheels 10 results in potential cost savings and considerable mass savings. In at least one application, the composite wheel 10 provides approximately sixty percent mass reduction when compared to the current wheel, thereby reducing the unsprung mass in the vehicle. The reduction in the wheel mass allows for additional mass savings in the suspension system, which can be redesigned to accommodate reduced mass composite wheels 10, resulting in overall cost savings. In addition, the composite wheels 10 provide repeatable fiber orientation through the nature of the pulling process, thus, making manufacturing process standards applicable to the composite wheels 10 of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for manufacturing a wheel from a braided fiber, comprising:
    braiding a fiber into a braided tube;
    pulling and folding said braided tube to create a first preform;
    weaving thermoplastic fibers into said first preform;
    trimming said first preform;
    placing said first preform into a wheel mold cavity;
    injecting a resin into said mold containing said first preform;
    curing said resin to form a first section of the wheel;
    trimming said first section to create a plurality of openings in said first section;
    manufacturing a second section of the wheel that includes a plurality of openings from a second braided tube;
    adhesively coupling said first section to said second section; and
    adhesively coupling an annular mount to said second section so that protrusions formed on said annular mount pass through said plurality of openings of said first section and said plurality of openings of said second section.

2. The method of claim 1 wherein said fiber includes at least one fiber selected from the group consisting of graphite, Kevlar, fiberglass, and natural fibers.

3. The method of claim 1 wherein pulling said braided tube further comprises inverting said braided tube upon itself.

4. The method of claim 1 wherein curing the resin further comprises cross-linking said resin in said braided preform to form said first section.

5. The method of claim 1 wherein said step of trimming said first section further comprises trimming said first section with a laser prior to said step of injecting resin.

6. The method of claim 1 further comprising the steps of:
    placing said preform into a mold; after placing said first perform into said wheel cavity;
    heating said preform with a hot gas; and
    shaping said preform into a desired shape.

7. The method of claim 6 wherein said thermoplastic fibers are selected from the group consisting of polyester, nylon and polypropylene.

8. The method of claim 1, further comprising:
    bonding said first section to said annular mount.

9. The method of claim 1 further comprising:
    bonding an annular support plate to said second section; and
    fastening said annular support plate to said annular mount opposite said annular mount.

10. A method for manufacturing a wheel from a braided fiber, comprising:
    braiding a fiber into a braided tube;
    pulling and inverting said braided tube to create a first preform;
    weaving thermoplastic fibers into said first preform;
    heating said first preform to shape said first preform;
    trimming said first preform with a laser;
    placing said first preform into a wheel mold;
    injecting a resin into said wheel mold containing said first preform;
    curing said resin to form a first section of the wheel;
    trimming said first section to create a plurality of openings;
    braiding a fiber into a second braided tube;
    pulling and inverting said second braided tube to create a second preform;
    weaving thermoplastic fibers into said second preform;
    trimming said second preform with a laser;
    placing said second preform into a wheel mold;
    injecting a resin into said wheel mold containing said second preform;
    curing said resin to form said second section of the wheel;
    trimming said second section to create a plurality of openings;
    aligning said plurality of openings formed in said second section with said plurality of openings formed in said first section;
    adhesively coupling said first section to said second section; and
    adhesively coupling an annular mount to said second section so that protrusions formed on said annular mount pass through said plurality of openings of said first section and said plurality of openings of said second section.

* * * * *